INVENTORS
LUIGI FALCONE
AGOSTINO PARISI
MARIOLA SARTORIS
BY
Hubbell, Cohen + Stiefel
ATTORNEYS.

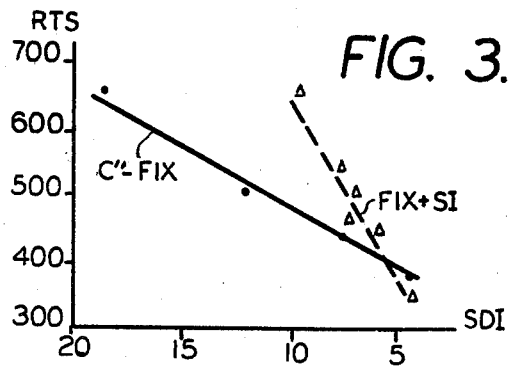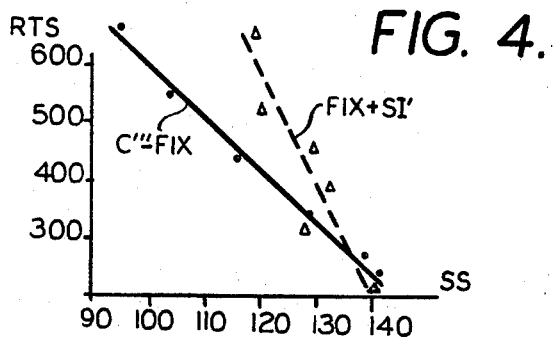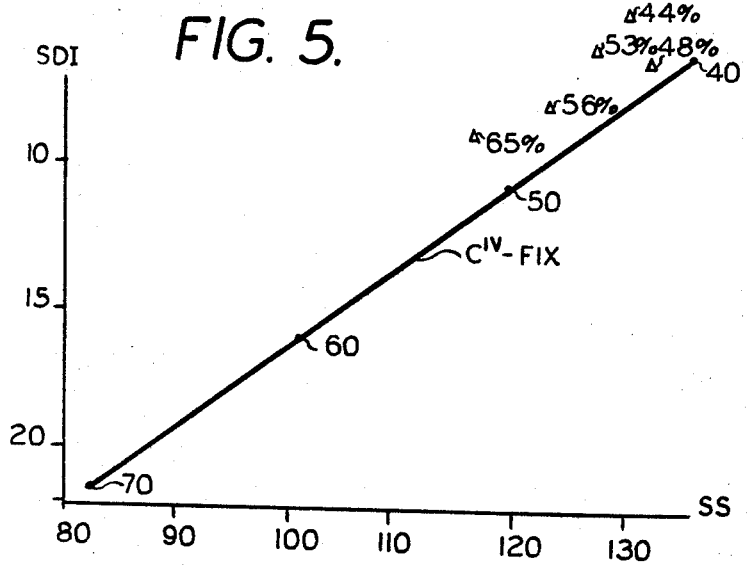

United States Patent Office 3,547,986
Patented Dec. 15, 1970

3,547,986
QUATERNARY AMMONIUM SALT COMPOSITIONS FOR MODIFYING CELLULOSE MATERIALS
Luigi Falcone, Via Sinigaglia 1; Agostino Parisi, Via Muggio 22; and Mariola Sartoris, Via T. Grossi 5, all of Como, Italy
Filed Nov. 30, 1965, Ser. No. 510,577
Int. Cl. C07c *101/00*
U.S. Cl. 260—501.13          3 Claims

ABSTRACT OF THE DISCLOSURE

Compounds having the general formula:

$$\underset{\underset{COO^-}{|}}{C(R')_2} - N^+(R'')_2 - R - N^+(R'')_2 - \underset{\underset{^-OOC}{|}}{C(R')_2}$$

wherein R is selected from the group consisting of the following radicals:
(a) —$CH_2$—O—$CH_2$—,
(b) —$CH_2O$—$CH_2CH_2$—$OCH_2$—, and (c) 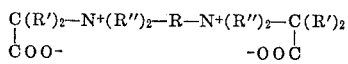

R' is hydrogen or an alkyl radical of the formula $C_nH_{2n+1}$ with $n$ being an integer from about 1 to 7; and R'' is an alkyl radical of the formula $C_nH_{2n+1}$ with $n$ being an integer of from about 1 to 7 are disclosed. These compounds have been found useful in compositions for treating cellulosic textile materials to impart superior wash and wear properties thereto.

---

The present invention relates to certain novel chemical compositions particularly useful and effective in the treatment of cellulose materials. It further relates to a method of making such novel compositions and to the application of these compositions to cellulose materials. The invention additionally includes cellulose materials treated with said compositions, which materials exhibit wash and wear properties superior to those of similar materials treated with compositions known and used heretofore.

The new chemical compositions of the present invention are quaternary ammonium salts of the general formula:

$$\underset{\underset{COO^-}{|}}{C(R')_2} - N^+(R'')_2 \rightarrow R \leftarrow N^+(R'')_2 - \underset{\underset{COO^-}{|}}{C(R')_2} \quad (I)$$

in which R is an organic bivalent electrodonating radical such as, e.g.,

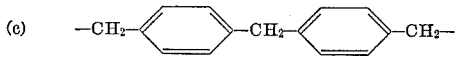

or

—$CH_2O$—$(CH_2)_2$—O—$CH_2$—

R' is hydrogen or an alkyl radical o fthe formula $C_nH_{2n+1}$ with $n$ being an integer from about 1 to 7; and R'' is alkyl of the formula $C_nH_{2n+1}$ with $n$ being an integer of from about 1 to 7.

From technical literature it is generally known that crease resistance and dimensional stability of cellulose materials is related to the introduction of transverse bonds between two polymeric chains of cellulose. Such transverse bonding can be obtained with substances of different classes:

(1) substances capable of polymerizing inside the fiber with the eventual formation of bonds of a physical nature with cellulose chains;
(2) polyfunctional substances capable of reacting in the micromolecular state with cellulose hydroxyls and forming bonds of a chemical nature.

Included among the substances belonging to the first class are resins based on formaldehyde, formaldehyde and urea, formaldehyde and melamine, etc., such resins generally being of the thermosetting type. The products obtained from such resins have many disadvantages, for example, poor washing resistance, complete depolymerization in weakly acid conditions, retention of chlorine, etc. Substances of this first class do impart dry crease resistance to fabrics (wear) resistance, but in general do not impart permanent dimensional stability properties.

Chemical substances belonging to the second class do produce bonds highly resistant to hydrolysis and permanent dimensional stability. They generally impart very good wet crease resistance (wash) to fabrics. The use of substances of this class has been essential if a fabric with grease resistant properties is desired and which is suitable for washing in automatic machines without loss in wet crease resist properties.

From the foregoing two classes one can obtain many products which, by virtue of their particular chemical constitutions, possess the possibility of polymerizing and at the same time forming bonds of chemical nature with cellulose. Representative of such products are "reactive" resins such as, e.g., cyclic derivatives of urea, methylolated ethylene-urea or methylolated propylene-urea with formaldehyde, etc. Such products in particular represent an improvement over conventional thermosetting resins in that, owing to their reactive function, they are less easily polymerizable and hence more ideal to react with cellulose. As a consequence they impart wet and dry crease resistance to cellulose materials.

Certain quaternary ammonium salts have been recognized as exhibiting reactivity with respect to cellulose. In general, such salts are useful for introducing into the cellulose chain organic radicals capable of imparting hydrophobic properties thereto. (See I.C.I.'s Velan PF British Pat. No. 466,817; Farbenindustrie's "Persistol KF" Am. Djest. Rep. 1946, 35, p. 124.) Recently the use of bipyridine salts of glycol chloromethyl ethers to impart crease proofing and dimensional stability to cellulose materials has been described (U.S. Pat. 3,115,383). The proposed reaction mechanism is as follows:

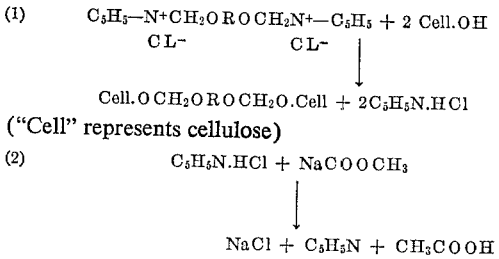

("Cell" represents cellulose)

(2)       $C_5H_5N.HCl + NaCOOCH_3$ $\downarrow$ $NaCl + C_5H_5N + CH_3COOH$

The product so reacting in the micromolecular state cannot polymerize and at the same time imparts wet and dry crease resist properties to fabrics. Nevertheless, the foregoing method suffers from a number of distadvantages, in particular, a notable yellowing or yellow-browning which appears in the treated material upon heating to the temperatures required for reticulation. Such yellowing requires a bleaching operation, which increases the cost of the process and also adversely affects the tensile properties of the fabric. The yellow-brown color which appears on the fabric is due to quaternary salt decomposition and to the presence of the pyridine nucleus in the product.

The foregoing phenomenon is aggravated by the necessity to operate under slightly alkaline conditions, e.g., by buffering with sodium acetate. This is necessary in order to avoid complete degradation of the fabric following evolution of hydrochloric acid. A reaction mechanism can be postulated to this end, known in organic chemistry, e.g., in the preparation of coloring substances of the cyanine type. Thus, in the case of quinoline:

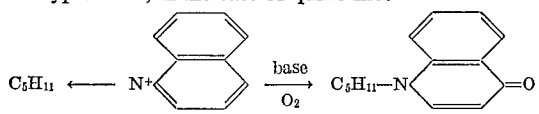

with the formation of quinoline products capable of condensing further with the formation of coloring substances.

The present invention provides a product which does not present the foregoing yellowing disadvantage, gives superior "wash and wear" properties together with superior tensile properties, is easy and economical to prepare, and does not require complex procedures for its application on cellulose fabrics. It will further be evident that the product of this invention can be used in combination with other substances to give rise to surprising and advantageous synergistic effects. This invention is further characterized by a simple and effective procedure for preparing the new products and applying them to cellulose materials without recourse to additional processing steps.

Finally, this invention results in cellulose materials having superior tensile and "wash and wear" properties.

This invention will be best understood by reference to the following detailed description taken in conjunction with the acompanying drawings wherein:

FIG. 3 is a plot of tearing strength against wet angle (S.D.I.) when using a conventional reactive N-methylol resin (curve C''-Fix) and when using a mixture of such conventional resin plus a product of the present invention (curve Fix-SI), each on cellulose material;

FIG. 4 is a plot of tearing strength against dry crease recovery angle (SS) when using a conventional reactive N-methylol resin (curve C'''-Fix) and when using a mixture of such conventional resin plus a product of the present invention (curve Fix-SI'), each on cellulose material;

Figure 6:
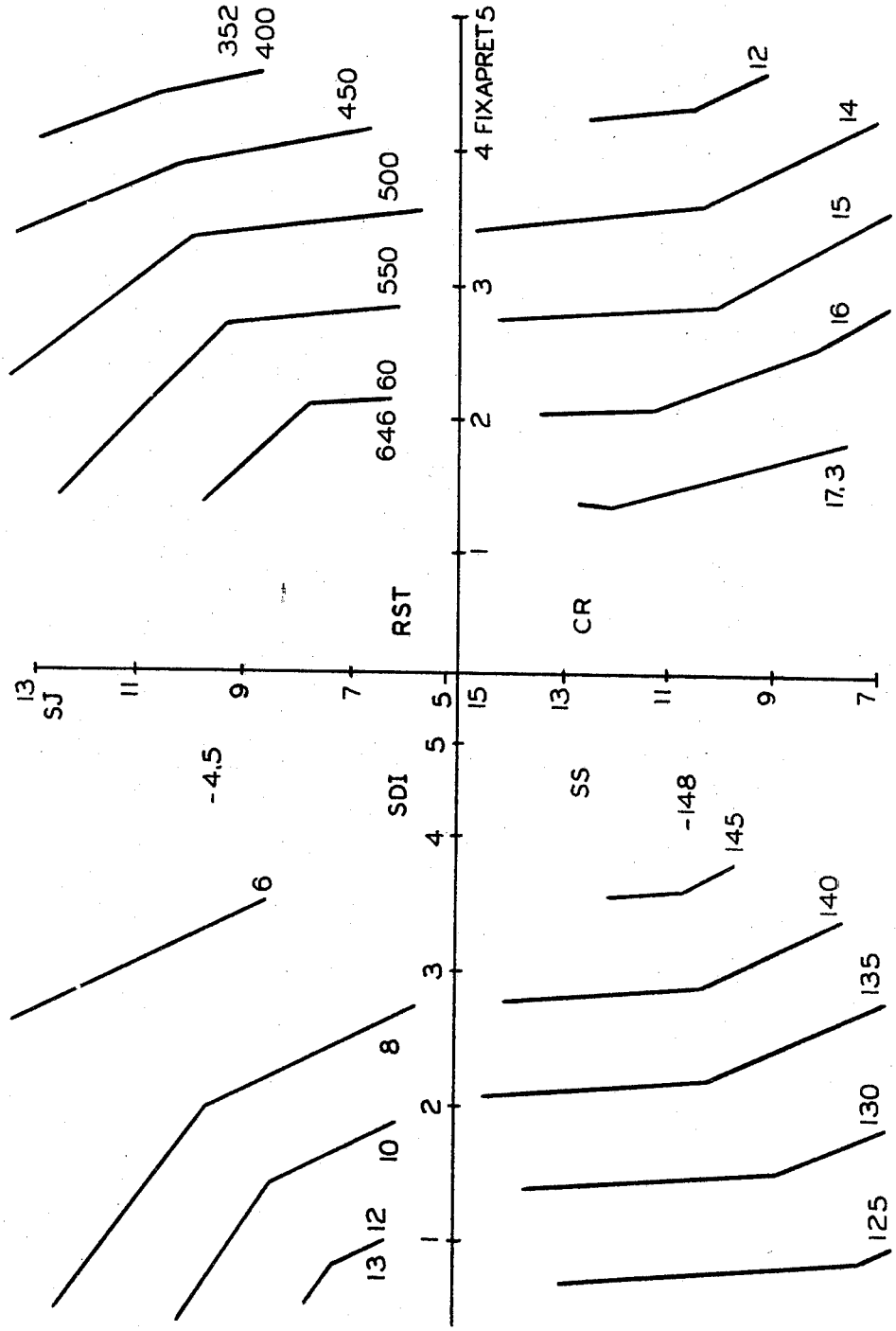

FIG. 5 is a plot of wet angle (S.D.I.) against dry crease recovery angle (SS), the straight line ($C^{IV}$-Fix) being for the use of only conventional reactive N-methylol resin, the triangular points being for the use of a mixture of conventional reactive N-methylol resin plus a product of the present invention, each on cellulose material; and FIG. 6 is a graphic interpolation of data appearing in Example 4 hereinafter.

The invention utilizes a solution containing or consisting of a product having the general Formula I for treatment of cellulose materials. Thus, it surprisingly has been ascertained that use of such products eliminates the yellowing disadvantage previously discussed and further eliminates the need to use a buffer substance in the reticulation process.

The products of the present invention are obtained by substituting, for the aromatic nucleus in the biquaternary salt, the radical $C(R_1)_2$—$COO^-$, which radical functions as an electron acceptor favoring the decomposition mechanism for the reticulation and at the same time functions as a negative ion of the complex. The reticulation reaction may be shown as follows:

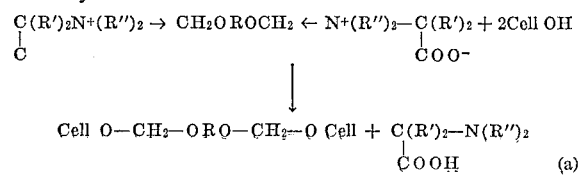

(a)

It will be seen from the above that there occurs the formation of an amino acid (a) which, being a weak acid, does not damage the fabric. It can easily be eliminated by washing and is almost odorless. Another fact which characterises the products of this invention is their ability to impart crease proof properties, i.e., wet crease resistance.

The behaviour of these products resembles polyfunctional substances, incapable of polymerizing, and acting in the micromolecular state with the formation of chemical bonds (resistant to hydrolysis in acid and alkaline mediums) with cellulose. This further ensures the obtaining of crease resistance, permanent dimensional stability in the most drastic conditions of use. In effect, the use of a quaternary salt corresponding to the formula:

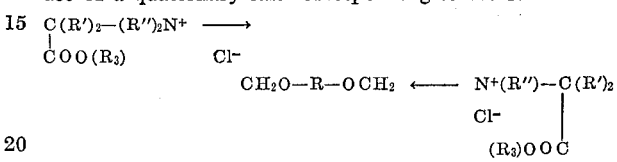

and therefore, with negative ions corresponding to strong acids and linked only by electrovalency to the nitrogen atoms, gives dry and wet crease resistance to cellulose materials (as shown in the subsequent examples). However, unlike the corresponding bipyridine salt, it does not impart a yellow-brown coloration to fabrics. This is still further evidence of the adverse effect the aromatic ring has on undesirable coloration.

The dry crease resistance property is, however, of importance with respect to the quality of uncrushable fabrics for commercial use. For this purpose it is possible to add appropriate quantities of thermosetting reactive resins to the aqueous impregnating solutions for the fabric containing the new products of this invention. To this end, we have found that there exists a synergism between the action of the new product and the action of a resin based on formaldehyde, urea, or melamine.

According to a further feature of the invention, the amino acid (a) can be used as catalyst for polycondensable monomers.

In fact, if the wet crease resistance (SDI) is considered as a function of different time periods, at temperatures of 150° C. and 120° C., following results are noted.

| Time period at 120° C. (minutes): | SDI |
|---|---|
| 2 | <44 |
| 3 | 44 |
| 5 | 43 |
| 15 | 38 |
| 30 | 35 |
| Time period at 150° C. (minutes): | |
| 2 | 29 |
| 3 | 21 |
| 5 | 18 |
| 15 | 16 |
| 30 | 16 |

From the above data it can be observed that the "inner salt" (described in detail hereinafter), although decomposing with great rapidity at 150° C., is virtually stable up to a temperature of 120° C. This is useful in the case of delayed polymerization (applied after the manufacture of a textile article). In these cases, the products applied to obtain crease resistance and dimensional stability must be completely unreactive in the drying stage following padding or for an eventual long storage period. In fact, even a slight prepolymerization of the monomer stabilizes the form in which the fabric lies at that moment and hinders the eventual form or creases which the manufacturer wishes to impart to the fabric. Moreover, it should be borne in mind that for economic reasons (speed of the operation) the temperature of the fabric during the drying stage should be at least about 120° C.

Therefore, the use of a system composed of the products of our invention and polycondensable monomers catalyzed by acids, is particularly suitable for the purpose, As seen in the examples, one obtains, besides equality in wash and wear properties, a lesser decrease in the resistance of cotton.

Rumens and collaborators (Tex. Rundschain, 18, 1961) have proved that for a given type of fabric there exists a linear relationship between crease resistance and tensile properties of the fabric in the sense that independent of the resin used there occurs, for example, a lowering of tearing strength with increasing crease resistance value. The slope of the straight line so obtained with a traditional finish should depend solely on the type of fabric used.

Exceptions to this rule are those finishes carried out on cotton in the swollen state, in which, however, there is a prevalence of wet crease recovery angle (wet crease resistance or S.D.I.) with respect to dry crease recovery (dry crease resistance).

To further illustrate the typical aspects and advantages of the invention, it is thought appropriate to demonstrate the development of these characteristics when conventional products are used as compared to the use of one of the products of this invention.

Figure 1:
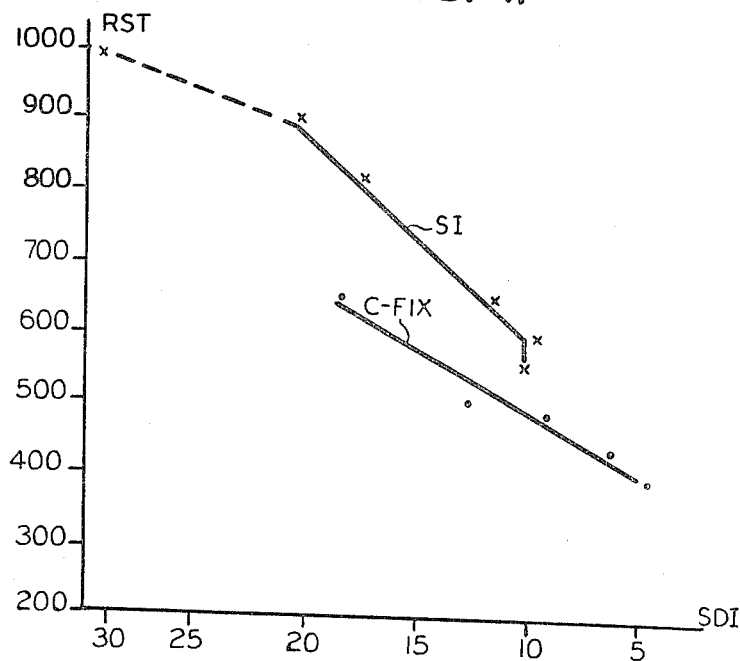
FIG. 1 is a plot of tearing strength (R.S.T.) against crease resistance (wet crease recovery angle S.D.I.) when using a conventional reactive N-methylol resin (curve C-Fix) and when using a produce of the present invention (curve SI), each on cellulose material.
Figure 2:
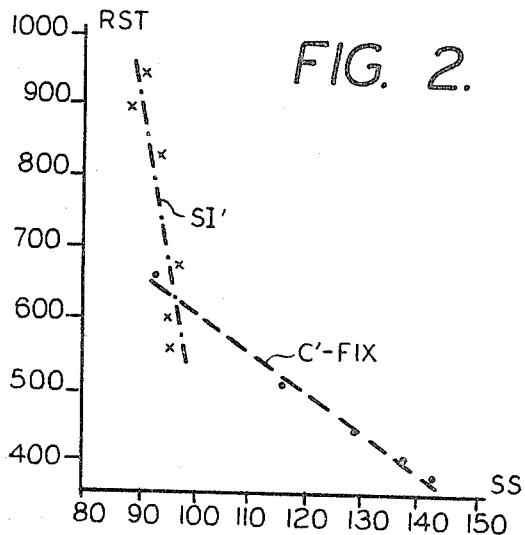
FIG. 2 is a plot of tearing strength (R.S.T.) against crease resistance (dry crease recovery angle SS) when using a conventional reactive N-methylol resin (curve C'-Fix) and when using a product of the present invention (curve SI'), each on cellulose material.

In FIGS. 1 and 2 there are reported graphically the values which are obtained for the tearing strength (R.S.T. on the ordinates) against crease resistance or wet crease recovery angle (S.D.I. on the abscissae FIG. 1 and curve C'-Fix in FIG. 2), and when using a product according to the invention ("inner salt") in quantities of 4–8–12–16–20–22% (curve SI in FIG. 1, curve SI' in FIG. 2).

From the figures it will be seen that the "inner salt" of the invention, although acting on non-swollen cellulose, gives essentially wet crease resistance. In FIG. 1 the curve SI of inner salt in fact gives higher values of SDI (wet crease resistance) as compared to the more modest values obtained in the corresponding curves SI' of FIG. 2 for the dry crease recovery angle or dry crease resistance.

In FIGS. 3 and 4 the values of tearing strength are plotted on the ordinates against the wet angle SDI (FIG. 3) and against the dry recovery angle SS (FIG. 4) when only the conventional resin Fixapret PH is used (curve C'' in FIG. 3 and curve C'''-Fix in FIG. 4) and when a mixture of the resin Fixapret PH and the inner salt according to the invention is used (curve Fix+SI in FIG. 3 and curve Fix+SI' in FIG. 4). It will be noted that the straight lines Fix+SI and Fix+SI' show a notable difference of slope with respect to the corresponding straight lines obtained for single components. In other words, when a mixture consisting of the inner salt according to the invention and a conventional resin is used, a greater tensile resistance is obtained for a certain value of crease resistance, as seen in FIGS. 3 and 4. This is one of the surprising and advantageous aspects of this invention. An inner salt according to the invention, which, as seen in FIGS. 1 and 2, imparts by itself essentially wet crease resistance, when used in a mixture with a formaldehyde or urea type resin, succeeds in raising the dry crease resistance values of the said resin.

Fixapret PH gives a finishing evenly distributed between wet and dry crease resistance. This is illustrated in FIG. 5 in which there is plotted the SDI (wet) values on the ordinate and the dry crease recovery angles SS on the abscissa. The straight line $C^{IV}$-Fix is for values which are obtained when only Fixapret PH is used, the residual values in tearing strength are plotted and indicated (70, 60, 50, and 40%). By the sides of the small triangles, which give values of SDI and SS for the mixture Fixapret—inner salt, there are analogously reported residual values in tearing strength.

From the characteristic points reported with small triangles it can be observed that, when a mixture of the product of the invention with Fixapret is used, a very good distribution of wet and dry crease resistance is obtained, with the further advantage however of a lesser decrease in tensile properties. These decreases are in general less, the distribution of SDI and SS being equal or, stated another way, with the tensile properties being equal, one obtains better crease resistance values when a mixture containing the product of the invention is used.

The novel products may be considered as products obtained by the reaction of a compound of the formula

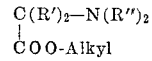

with a compound of the formula $$X_1—R—X_2 \quad (III)$$

or as products obtained by the reaction of a compound of the formula

with a compound of the formula $$(R'')_2N—R—N(R'')_2 \quad (III')$$

in which R', R'' and R are the same as previously defined in Formula I and X, $X_1$ and $X_2$ may be the same or different and are halogen, monovalent sulphonic radicals of the formula —OSO$_2$O-Alkyl, or monovalent phosphoric radicals of the formula

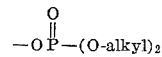

The reaction between compounds II or II' with compounds III or III' is carried out under anhydrous conditions to thereby obtain a biquaternary ammonium salt containing an external negative ion. Such salt is then treated with an aqueous solution, giving rise to the betaine cyclisation with the formation of internal negative ions.

According to a particularly interesting aspect of the invention, the products of the general Formula I are used for treatment of cellulose materials with such products in the form of aqueous solutions having a concentration of from about 1 to 50% by weight. To this compound there can surprisingly be added a quantity of from about 0.5 to 10% by weight (of the solution) of a monomer capable of polymerizing to a formaldehyde, urea-formaldehyde, or melamine-formaldehyde resin. Such monomer is preferably formaldehyde, dimethylol-urea, polymethylol-melamine, dimethylol-ethyleneurea, dimethyloldihydroxyethyleneurea, dimethylolpropyleneurea, tetramethylolacetyleneurea, dimethylolbutandioldiurethane, or a polyacetal derivative.

Together with one of the aforesaid monomers the solution may also contain from 10 to 30% by weight (based on the monomer) of an acid catalyst.

To apply the products of this invention to textile materials, a very simple method may be used which does not require any modification of the techniques widely used in the textile industry. The procedure involves impregnating the textile material with a composition made up of an aqueous solution of a product of Formula I, with or without the polycondensable monomer, drying the impregnated material at about 70–120° for a period of time of from about 1 to 15 minutes to eliminate water, and successively bringing dried material up to about 130–180° C. for a period of about 1 to 12 minutes, thereby effecting reticulation and eventual polycondensation.

The so treated products have the great advantage of possessing a higher dry and wet crease proofness, excellent tensile properties, and, upon comparison with conventionally treated materials, a greater degree of creaseproofing with the tensile properties being equal, or higher tensile properties with the degree of creaseproofing being the same.

The following examples will further illustrate this invention.

PREPARATION OF A NOVEL PRODUCT ACCORDING TO THE INVENTION

A method of preparation of the products according to the invention will now be described having the general formula in which different radicals have the following particular values $R=-CH_2O(CH_2)_2OCH_2-$; $R'=H$; and $R''=-C_2H_5$; by which Formula I becomes

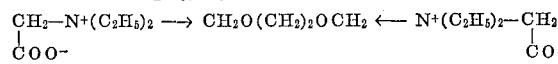

N-diethyl-methyl acetate is prepared by reacting diethylamine with methyl chloroacetate in a benzene solution according to known method (see C.A. 49—3071g—1955). A yield of 70%, based on the methylchloroacetate, is obtained. The product boils at 63° C. at 13/mm. Hg.

Bischloromethylether is obtained by known method (C.A. 42, 18800). Hydrogen chloride gas is bubbled through a flask containing 1 mole ethyleneglycol and 2.2 moles paraformaldehyde in anhydrous benzene until saturation (65–70%) yields are obtained based on the glycol. The product boils at 9–100° C. at 20 Hg and has a reactive index $n_D^{14}=1,4659$.

The preparation of the bis - methyl - acetate-diethyl-ammonium salt of bis - chloromethyl - glycolether (identified hereinafter by the shorter name bis - ammonium - I - chloride) is carried out in an inert solvent (toluene), reacting 2.2 moles of methyl - N - diethyl - acetate with 1 mole of bis - chloromethyl - glycol - ether with cooling. After standing for about three hours the solution of the salt in methanol is filtered and evaporated. A crystalline product is obtained having a melting point of 117 C.; nitrogen found=6.5%; nitrogen theoretical=6.24%; chlorine found=16.2%; chlorine theoretical=15.85%. (In practice it is better to add water directly to the salt suspension in solvent and then separate the latter.) Finally by adding a stoichiometric quantity of 10 N sodium hydroxide (based on chlorine) to the aqueous solution of the bis-ammonium-I-chloride, saponification of the ester results with the formation of the "inner salt" according to the following:

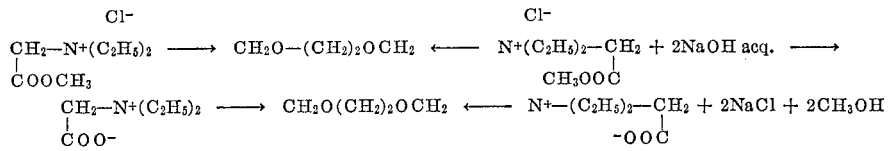

Initially the solution shows a lightly alkaline pH of 7.5–8.5 which after some hours is stabilized at about 5.

TREATMENT AND PROPERTIES OF THE INNER SALT

The aqueous solution containing the inner salt is evaporated under vacuum. The residue is taken up in methanol and sodium chloride is eliminated by filtration. On further evaporation a very viscous, dense liquid difficult to crystallize is obtained.

A value of 7.8% is found for the nitrogen content of the product. (Theoretical nitrogen content for the inner salt=8.05%.)

TREATMENT OF TEXTILE MATERIALS

The realization of the present invention is easily carried out with an aqueous solution of the inner salt (obtained, for example, by the saponification of bis-2-methyl-acetate - diethyl - ammonium salt of bis-chloromethyl-glycolether with soda) at a concentration of from about 1 to 50% in weight. The textile fabric is then padded with this solution and the pressure is regulated so as to put on the fabric a percentage from 1 to 30% active product (inner salt) of the weight of the fabric. So, for example, if the pressure between the rollers is such as to give a 100% moisture absorption on the fabric, then the concentration of the active product on the fabric is equal to its percentage concentration in the solution.

After the padding operation the fabric is dried and then subjected to reticulation. Drying is carried out at a temperature of about 70°–120° C. for about a 1–15 minute period, while the reticulation may be effected between at about 130–180° C. for a time of about 1 to 12 minutes.

After reticulation the fabric may be washed with a lightly alkaline solution, for example by using sodium carbonate at a temperature of 40–60° C., then with water until neutral.

If the use of a formaldehyde-based resin is desired, the procedure is virtually the same. In this case it is desirable, but not essential, to work in the presence of acid catalysts, for example, $ZnCl_2$, in an amount of about 20% by weight of the formaldehyde resin used.

The ratios between the active ingredient (the inner salt) and the formaldehyde-based resin are dependent on the particular resin used and the dry crease resistance which is required.

For example, in the case of propylene-urea for cotton poplin having a weight of about 140 gm./m.², quantities of 5% inner salt and 2.5% resin on the fabric are sufficient to obtain very good dry and wet crease resistance, good values for tensile resistance, and insolubility in cupro-ethylene-diamine solutions after acid and alkaline hydrolysis. The fact is made particularly clear whereby the application of the new products to the cellulose materials is done by methods which do not require additional operations or apparatus. With conventional methods and devices, by virtue of the use of the new compositions, one can improve the crease proofness of fabrics and reduce the losses of mechanical properties formerly shown when crease proofness was improved. In the following illustrative example the properties and measurements are as follows: (the symbol ‰ means parts by weight per liter of solution).

Tensile strength (in kg.); sample sizes: 5 x 10 cm.; extension velocity 12 cm./1 minute
Breaking extension—in percentage
Tearing strength—ASTM D 1424—59 units of measurements in g.
Dry crease resistance—ASTM D 1295—60T unit of measurement in degrees
Wet crease resistance—Total method
S.D.I. (smooth-drying-index)
Sample sixes 6.5 x 24 cm.
Wetting bath 2.5‰ soap at 60° C.
Crease at 60° C.
Readings with light at zero incidence
Unit of degree measurement (approximately 180–2S.D.I.=crease angle)
Resistance to abrasion—abrasion on wool, unit of measurement=number of revolutions necessary to break two threads.
W./W. effect (wash and wear)=Monsanto test boiling procedure (Machine Wash Drip Dry); unit of measure: numbers going from 1 to 5.

SOLUBILITY TESTS (A) Acid hydrolysis:   ‰
   HCl—at 75° C. for 1 hour _____ 5
   Surfactant _____ 0.2
(B) Alkaline hydrolysis:   ‰
   NaOH 36 Be—at 75° C. for 1 hour _____ 5
   Surfactant _____ 0.2
(C) Cuproethylenediamine solution:
   25 g. copper hydroxide
   24 cc. ethylenediamine
   330 cc. water Method: 0.1 g. threads are put in vessel containing 50 cc. cuproethylenediamine solution and little glass balls. The vessel is agitated intermittently and left standing for 12 hours. It is filtered and washed with 0.1 N HCl, then thoroughly with water, and finally dried and weighed. The viscosity of the cuproethylenediamine solution is periodically determined. In general, owing to the solubility of the fibres being 5–10%, there is not an appreciable variation of viscosity of the cuproethylenediamine solution.

Example 1

A 46.5% solution by volume of the inner salt is prepared as described previously. The pH of the solution corresponds to a value of 5.5. A piece of bleached poplin fabric weighing 140 g./m.$^2$ is impregnated in a foulard with solutions of increasing concentrations, with cylinder pressures such as to permit a 75% absorption. There are deposited 4 to 24 g. of 100% inner salt on 100 g. of fabric. The fabric is then dried at 80% in a dry air oven, polymerized at 150 C. for 4 minutes, washed with water at 60° C. and in running cold water, then dried.

The following tests were carried out on the fabric with the results as tabulated.

TABLE I

| Solutions | Percent product on fabric | S.D.I. Warp | S.D.I. Weft | Dry crease recovery angles Warp | Dry crease recovery angles Weft | W.W. |
|---|---|---|---|---|---|---|
| Control | 0 | 70 | 60 | 68 | 56 | 1 |
| Run number: | | | | | | |
| 1 | 4 | 31 | 28.7 | 95 | 90 | 2/3 |
| 2 | 8 | 24.1 | 20.5 | 96 | 90 | 3 |
| 3 | 12 | 22 | 17.5 | 99 | 96 | 4 |
| 4 | 16 | 15.6 | 21.1 | 104 | 97 | 4/5 |
| 5 | 20 | 15.1 | 9.8 | 100 | 97 | 4/5 |
| 6 | 22 | 13.2 | 10.9 | 101 | 95 | 4/5 |
| 7 | 24 | 12.7 | 9.3 | 103 | 97 | 4/5 |

From the preceding data it appears clear that the inner salt of this invention beneficially influences the wet crease resistance properties.

Improvements of other important properties as, for example, resistance to hydrolysis, chlorine retention, dimensional stability, etc. are examined hereinafter.

Example 2

The following determinations have been carried out on Run No. 5 in Example 1:

(1) Percentage of insoluble cotton.—The sample treated with inner salt was immersed in cuproethylenediamine solution for 12 hours. This was also done with the sample treated with inner salt and submitted to acid hydrolysis and with another sample treated with inner salt and submitted to alkaline hydrolysis. The viscosities of the final solutions in cuproethylenediamine were determined and compared with the original solution.

| | Viscosity | Insolubility percentage |
|---|---|---|
| Sample treated with inner salt | 2′35″ | 97 |
| Same plus acid hydrolysis | 2′35″ | 94 |
| Same plus alkaline hydrolysis | 2′35″ | 96 |
| Cuproethylenediamine solution | 2′35″ | |

(2) Chlorine retention.—Chlorine retention was evaluated on the basis of degradation caused by the "Scorch Test" (described below) on a piece of fabric, and compared with a fabric not having undergone the test. Both samples of fabric were treated with the inner salt.

"SCORCH TEST"

Pretreatment:

Wash at the boil for 30 minutes in a 5‰ carbonate-5‰ soap solution bath ratio 1:50 rinsing in soft water—spin drying treatment at 27° for 15 minutes in the solution: 2.5‰ active chlorine, 0.5‰ monionic inhibitor.

The pH of the bath must be 9.5, obtained by eventual addition of sodium bicarbonate.

Rising in water six times—drying.

"Scorching"—Ironing of the sample between two metallic plates at 185° C. for 30 seconds.

The degree of yellowing is evaluated and after conditioning the tensile strength (T.S.) in the weft is determined.

| | T.S. | Variation percent |
|---|---|---|
| Sample treated with inner salt | 31.6 | |
| Sample treated with inner salt and subjected to chlorine test | 32.6 | +3.1 |

(3) Dimensional stability.—Dimensional stability is evaluated on a sample treated with inner salt in comparison with untreated fabric.

The samples under examination were kept in a bath containing 5‰ commercial detergent for 40 hrs., rinsed in hot and cold water, dried, conditioned at 21° C. and 65% relative humidity. Results obtained were:

| | Warp | Weft |
|---|---|---|
| Nontreated, percent | −5.3 | −0.1 |
| Treated, percent | +0.03 | +0.05 |

Example 3

A 50% by volume inner salt solution was obtained by the betain cyclization with soda of the product of the reaction of methyl-N-diethylacetate with the corresponding chloromethylether of formaldehyde. The latter was prepared by bubbling hydrogen chloride gas through paraformaldehyde dissolved in sulfuric acid (H. Schneider-Amgewade Chemie 51–274, 1938). Yields higher than 80% were obtained. A bleached poplin fabric weighing 140 g./m.$^2$ was impregnated with a 320‰ solution of the inner salt described above at pH=5, and was padded with an absorption of 75%. There was deposited 12 g. of the product at 100% on 100 g.

The following tensile and crease resistant properties were determined.

| | T.S. | Breaking elongation, percent | Tearing strength | S.D.I. Warp | S.D.I. Weft | Dry crease recovery angle Warp | Dry crease recovery angle Weft |
|---|---|---|---|---|---|---|---|
| Nontreated | 41.4 | 15.3 | 1,014 | 42 | 41 | 68 | 56 |
| Treated | 39.4 | 14.7 | 845 | 23.1 | 18.1 | 91 | 86 |

The fabric does not yellow, and has an excellent dimensional stability, does not exhibit chlorine retention, and is resistant to acid and alkaline hydrolysis.

Example 4

A bleached poplin fabric weighing 140 g./sq. m. was impregnated with solutions at various concentrations of inner salt and propylenurea resin (Fixapret PH) mixtures. $ZnCl_2$ was used as catalyst for the latter in an amount equal to 18 wt. percent of the resin. The pressure between the cylinders was regulated so as to give an absorption of 76%.

The fabric was dried at 80° C. for four minutes, washed in water at 60° C. for 1 minute and in running water, then dried.

In the following table the percentages of product at 100% deposited on the fabric from the single solutions and the relative tensile and crease resistance properties are given for the warp and weft.

TABLE II

| Test No.: | Percentage product on fabric | | T.S. | Breaking elongation, percent weft | Tearing strength, weft | S.D.I. | | Dry crease recovery angle | |
|---|---|---|---|---|---|---|---|---|---|
| | Inner salt | Fix. PH | | | | Warp | Weft | Warp | Weft |
| 0 (control) | | | 41.4 | 15 | 1,000 | 70 | 60 | 68 | 56 |
| 1 | 10 | 3.04 | 27.8 | 10 | 528 | 8.5 | 7.9 | 134 | 129 |
| 2 | 12.5 | 1.24 | 32.6 | 12 | 560 | 9.5 | 8.7 | 122 | 118 |
| 3 | 6.6 | 1.52 | 34.6 | 12 | 646 | 13.3 | 10.3 | 123 | 116 |
| 4 | 5.5 | 3.92 | 28 | 12.3 | 480 | 9.1 | 7.7 | 135 | 130 |
| 5 | 10.7 | 5 | 22.2 | 9.7 | 352 | 5.5 | 4.5 | 148 | 140 |
| 6 | 15 | 3.4 | 26.2 | 10 | 436 | 8.7 | 6 | 138 | 128 |

In FIG 6 a graphic interpolation is given (pentagon method) with the inner salt S.I. (ordinate) and propylenurea Fixapret (abscissa) concentrations and relative to SDI properties (upper left), tearing strength RST (upper right), dry crease resistance SS (lower left), and tensile strength (C.R. lower right). It will be seen that the tensile strength and dry crease resistance are more sensitive to variation of propylenurea. Wet crease resistance S.D.I. and tearing strength are influenced by variation of both components. Small quantities of inner salt (for example 5% on the fabric) together with about 3% of propylenurea impart excellent dry and wet crease resistance properties together with good tensile properties.

As is seen from Test No. 3 in Table II, when wet or dry crease resistance properties are obtained which are very good and correspond to the highest standards required for most applications (particularly in the case of cotton shirts), the losses in tensile properties are only 15% for tensile strength and 35% for tearing strength. These losses are far less than those resulting from the use of conventional products. Additionally, the present invention enables one to obtain excellent creaseproof and tensile properties without further finishes which, if desired, could further improve the given values, as by the addition of suitable softeners.

Example 5

The following two solutions were prepared:

| | 1, ⁰/₀₀ | 2, ⁰/₀₀ |
|---|---|---|
| Bis ammonium inner salt 50% | 134 | 134 |
| Fixapret PH | 75 | 75 |
| $ZnCl_2$ 10% | 66 | |

A bleached poplin fabric weighing 140 g./sq.m. was impregnated with each of the solutions, padded with an absorption of 75%, dried at 80° C., polymerized at 150° C. for 4 minutes, washed once with water at 60° C. and then in running water, then dried.

The following data on tensile and crease resistant properties were obtained:

| | Tearing strength, weft | S.D.I. | | Dry crease recovery angle | |
|---|---|---|---|---|---|
| | | Warp | Weft | Warp | Weft |
| Solution 1 | 676 | 13.5 | 13.5 | 130 | 124 |
| Solution 2 | 724 | 14 | 13.5 | 127 | 119 |

From the foregoing the catalytic effect of the "inner salt" on the ureic resin is readily apparent.

Example 6

Three cotton articles were employed:
Art. 1—petrol cotton manufacturing fabric
Art. 2—beige "Gabardine" cotton
Art. 3—gret "Gabardine" cotton Each was treated with solutions 1, 2, 3 and 4 as shown in the following table.

| Product | Composition | Solution, salinity | | | |
|---|---|---|---|---|---|
| | | 1 | 2 | 3 | 4 |
| Inner salt (41.5% by volume solution) | | | | 240 | 240 |
| Fixapret CP | Dihydroxyethylenurea | 110 | 110 | 45 | 45 |
| Persistol extra | Paraffin plus Zr salts | | 50 | | 50 |
| Decetex 104 | Dow-Corning, Silicone | | 15 | | 15 |
| Polyonic | Arkansas, Polyethylene | 16.6 | | 16.6 | |
| Primal AH8 | Rohm & Haas, Acrylic resin | | 50 | | 50 |
| $MgCl_2$ crystals | | 16.5 | 16.5 | | |

Solutions 1 and 2 are based on dihydroxyethylenurea, a conventional commercial product particularly suitable for delayed cure (see, e.g., Am. Dyestuff Reporter, Sept. 13, page 86, P 746), and solutions 3 and 4, further containing the "inner salt" as creaseproof and catalyst agents for the dihydroxyethylenurea. The fabrics were padded in each of the solutions (75% absorptions) and dried for 4 minutes at 120° C. Samples taken from the fabrics were prepolymerized by ironing for 1 minute at 150° C. and then polymerized for 10 minutes at 160° C. In both cases an excellent permanence of crease was noted, even after repeated washings with boiling water (in a commercial washing machine). This shows that there was no prepolymerization during drying even when carried out under drastic conditions.

In Table III wash and wear properties and tensile resistance values before and after treatment are reported. As can be seen, formulations 3 and 4 based on the inner salt, show less of a decrease in tensile properties.

TABLE III

| | Tearing strength | Tensile strength | Wash and wear |
|---|---|---|---|
| Article 1—petrol reference | 2,003 | 71.4 | |
| Solution: | | | |
| 1 | 800 | 27.2 | 4/5 |
| 2 | 640 | 30.2 | 4/5 |
| 3 | 1,056 | 38.4 | 4/5 |
| 4 | 1,056 | 41.6 | 4 |
| Article 2—beige "gabardine" cotton reference | 3,034 | 63.4 | |
| Solution: | | | |
| 1 | 1,072 | 32.8 | 4/5 |
| 2 | 880 | 25.2 | 4/5 |
| 3 | 1,584 | 40.8 | 4/5 |
| 4 | 1,616 | 43.2 | 4 |
| Article 3—grey "gabardine" cotton reference | 2,891 | 60.2 | |
| Solution: | | | |
| 1 | 1,162 | 27.6 | 4/5 |
| 2 | 888 | 26.4 | 4/5 |
| 3 | 2,048 | 46.8 | 4 |
| 4 | 848 | 40.8 | 4 |

The following solutions were prepared so as to show the utilization of "inner salt"—polycondensable monomer catalysed by acids in "delayed cure" system:

| | Solution 1 | Solution 2 |
|---|---|---|
| Inner salt 50% by volume solution, salinity | 270 | |
| Fixapret PH, salinity | 90 | 200 |
| $ZnCl_2$ at 10% by volume, salinity | | 176 |

Bleached cotton poplin weighing 140 g./sq. m. was padded with each of the solutions (75% absorption), dried at 80° C. for 10 minutes, and then cured for 5 minutes at 145° C. The properties obtained are as follows:

|  | Tensile strength | Tearing strength | Dry crease recovery angle |
|---|---|---|---|
| Solution 1 | 35.4 | 680 | 135 |
| Solution 2 | 30.8 | 580 | 140 |

A part of the fabric dried only was kept in a conditioning room (20° C. and 65% relative humidity). Every month samples were taken and tensile properties and crease resistance measured. Results obtained are as follows:

|  | Tensile strength | Tearing strength | Dry crease recovery angle |
|---|---|---|---|
| Solution 1 after drying | 57 | 1,091 | 65 |
| Solution 2 after drying | 44.8 | 1,088 | 80 |
| Solution 1 after 1 month | 58.2 | 976 | 90 |
| Solution 2 after 1 month | 45.4 | 800 | 115 |
| Solution 1 after 2 months | 53.4 | 1,003 | 90 |
| Solution 2 after 2 months | 44.2 | 850 | 117 |
| Solution 1 after 3 months | 52.6 | 1,029 | 93 |
| Solution 2 after 3 months | 35.6 | 650 | 120 |

As can be seen from the foregoing, resin 2 Fixapret PH (propylene-urea) is not stable in storage in the presence of an acid catalyst. In practice a complete polymerization occurs after 3 months storage. In contrast, this same resin is stable if used with the inner salt. This shows that the acidity necessary for polycondensation of the monomer is only supplied at the temperature of polymerization.

Example 7

A test has been carried out comparing bis-ammonium 1 chloride with bis chloromethylglycol ether of bis pyridine chloride according to known techniques.

The pyridine salt prepared from pyridine and bischloro methylglycol ether in an inert solvent, gave the following data:

Percentage chlorine, theoretical=22.4
Percentage chlorine, found=22.8

Two equimolecular solutions of the products, each buffered with the same amount of sodium acetate, were prepared. Bleached poplin fabric weighing 140 g./sq. m. was impregnated and padded in order to retain 0.038 molar percent of the two products. (The quantity of sodium acetate employed was 120% in moles/moles of the two products.) The properties of the treated fabric are reported in the following table:

|  | Bis-ammonium 1 salt | | Bis-pyridine salt | |
|---|---|---|---|---|
| Tensile strength | 25.2 | | 24 | |
| Tearing strength | 500 | | 580 | |
|  | Warp | Weft | Warp | Weft |
| Wet crease resistance | 11.6 | 8.7 | 11.1 | 10 |
| Dry crease resistance | 115 | 107 | 121 | 105 |

It is important to note that the fabric treated with the pyridine salt gives an intense yellow coloration in comparison to a white color obtained when using bis-ammonium 1 chloride. A bleaching operation was carried out on the yellow colored fabric as follows:

|  | ‰ |
|---|---|
| Active chlorine at 20° C. for one hours successively | 2 |
| Hydrogen peroxide+optical brightening agent | 3 |

Even after this operation an appreciable difference in whiteness is noted, i.e. the fabric treated with bis-ammonium 1 chloride is distinctly the whiter of the two.

Variations can, of course, be made without departing from the spirit of this invention.

Having thus described our invention, what we desire to secure and claim by Letters Patent is:

1. A compound of the general formula:

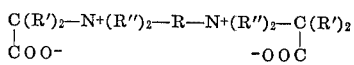

wherein R is selected from the group consisting of the following radicals
  (a) —CH$_2$—O—CH$_2$—,
  (b) —CH$_2$O—CH$_2$CH$_2$—OCH$_2$—

(c) 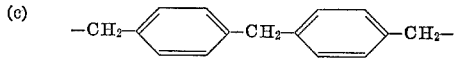

R' is hydrogen or an alkyl radical of the formula C$_n$H$_{2n+1}$ with $n$ being an integer from about 1 to 7; and R" is an alkyl radical of the formula C$_n$H$_{2n+1}$ with $n$ being an integer of from about 1 to 7.

2. The compound of claim 1 wherein R' is hydrogen, R" is ethyl, and R is the radical

—CH$_2$O—(CH$_2$)$_2$OCH$_2$—

3. The compound of claim 1 wherein R' is hydrogen, R" is ethyl and R is the radical —CH$_2$—O—CH$_2$—.

References Cited
UNITED STATES PATENTS

| 3,113,026 | 12/1963 | Sprung | 260—501.13 |
| 2,313,573 | 3/1943 | Orthner et al. | 260—501.13 |
| 2,217,846 | 10/1940 | Orthner et al. | 260—501.13 |
| 2,087,565 | 7/1937 | Balle et al. | 260—106 |

LEON ZITVER, Primary Examiner

M. W. GLYNN, Assistant Examiner

U.S. Cl. X.R.

8—116.2; 117—139.4; 252—8.6; 260—459, 924